(12) United States Patent  
Wood et al.

(10) Patent No.: US 8,004,982 B2
(45) Date of Patent: Aug. 23, 2011

(54) METHOD AND SYSTEM FOR CHOOSING COMMUNICATION SERVICES

(75) Inventors: Daniel C. Wood, East Peoria, IL (US);
Steven W. O'Neal, Bartonville, IL (US);
Alan L. Ferguson, San Jose, CA (US);
Brian L. Jenkins, Washington, IL (US);
Trent R. Meiss, Eureka, IL (US)

(73) Assignee: Caterpillar Inc., Peoria, IL (US)

(*) Notice: Subject to any disclaimer, the term of this patent is extended or adjusted under 35 U.S.C. 154(b) by 719 days.

(21) Appl. No.: 11/581,694

(22) Filed: Oct. 16, 2006

(65) Prior Publication Data
US 2008/0089328 A1    Apr. 17, 2008

(51) Int. Cl.
*H04L 12/26* (2006.01)
(52) U.S. Cl. ...................................................... 370/231
(58) Field of Classification Search .................... None
See application file for complete search history.

(56) References Cited

U.S. PATENT DOCUMENTS

| | | | | |
|---|---|---|---|---|
| 3,863,225 A | * | 1/1975 | Preiss | 710/244 |
| 6,445,679 B1 | * | 9/2002 | Taniguchi et al. | 370/232 |
| 7,313,547 B2 | * | 12/2007 | Mocek et al. | 705/51 |
| 2005/0267998 A1 | | 12/2005 | Ferguson et al. | |
| 2006/0079278 A1 | | 4/2006 | Ferguson et al. | |
| 2007/0058561 A1 | * | 3/2007 | Virgile | 370/252 |
| 2008/0077310 A1 | * | 3/2008 | Murlidar et al. | 701/117 |

* cited by examiner

*Primary Examiner* — Raj K Jain
(74) *Attorney, Agent, or Firm* — Steve D. Lundquist

(57) ABSTRACT

A method and system for determining one or more desired communication services for an application. The method and system includes determining at least one application operating parameter, at least one communication operating parameter, at least one cost factor, and at least one value factor. The method and system further includes assigning a priority level to each application operating parameter, communication operating parameter, cost factor, and value factor. Additionally, the method and system includes comparing the priority levels to each other, and determining a desired communication service based on the compared priority levels.

18 Claims, 4 Drawing Sheets

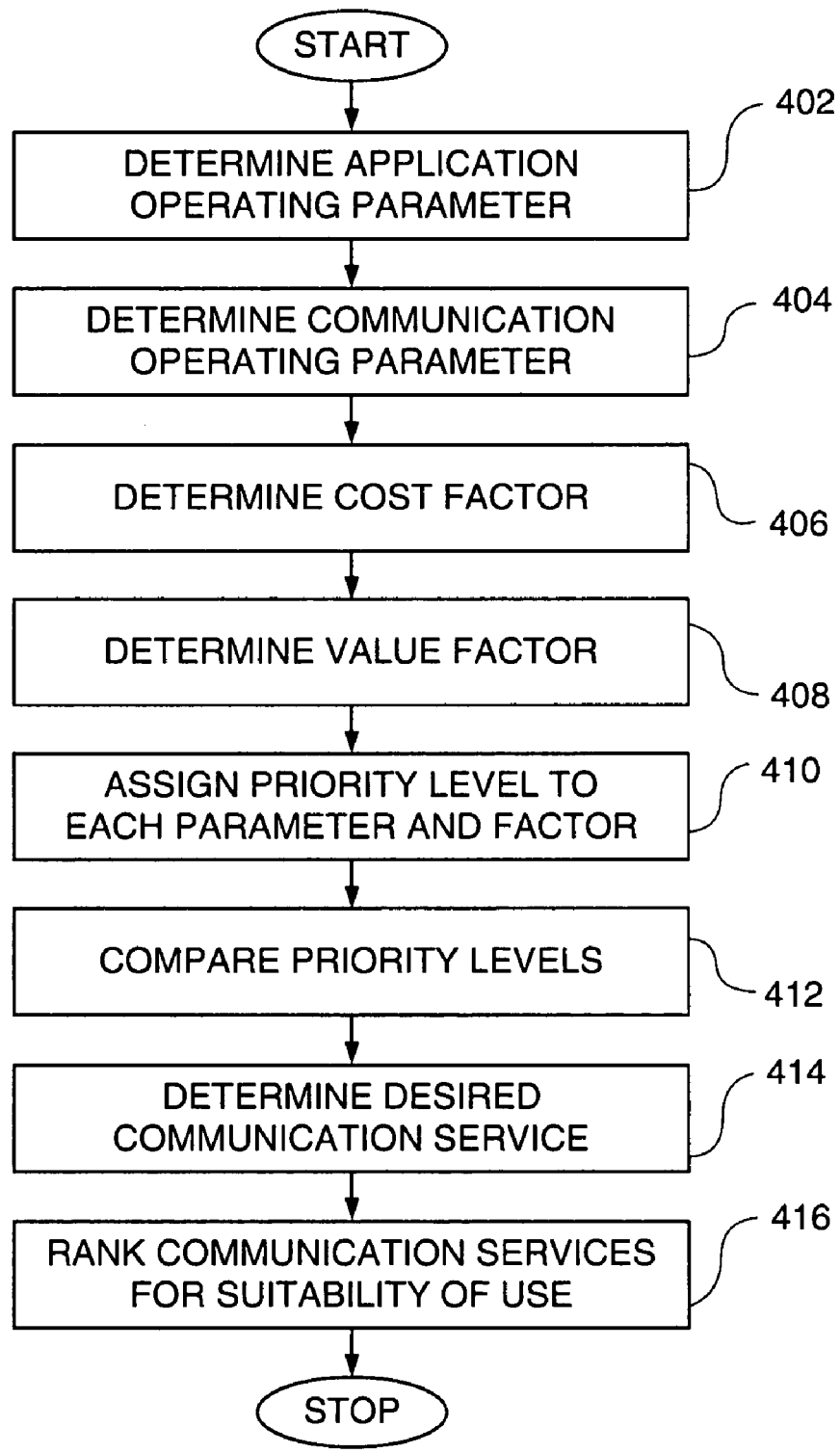

METHOD AND SYSTEM FOR CHOOSING COMMUNICATION SERVICES

TECHNICAL FIELD

This invention relates generally to a method and system for choosing a communication service and, more particularly, to a method and system for determining one or more desired communication services for an application.

BACKGROUND

The need for reliable and cost effective communications is mandatory in many application environments. However, as applications become increasingly complex, and as associated communication needs also increase in complexity, it has become very difficult to know what communications methods and equipment will be adequate for the anticipated tasks.

For example, there are many applications in which machines traverse work areas and must be in communication with other machines, remote locations, and the like. One such application might include mobile machines at a work site, for example mining or construction machines. The types of communication technologies and equipment that might be required may vary based on numerous factors, such as geographical location and distances, the amount and type of information that must be communicated, and environmental conditions. In addition, the importance of reliable information transfer balanced with budget constraints factor in to communication equipment and method choices.

In the past, communication services have been chosen based on past experience of the dealers and the customers. The complex nature of work situations make this a less than ideal technique for choosing the right services, and the cost of making some wrong choices can have profound effects on a customer's bottom line.

The present invention is directed to overcoming one or more of the problems as set forth above.

SUMMARY OF THE INVENTION

In one aspect of the present invention a method for determining one or more desired communication services for an application is disclosed. The method includes determining at least one application operating parameter, at least one communication operating parameter, at least one cost factor, and at least one value factor. The method further includes assigning a priority level to each application operating parameter, communication operating parameter, cost factor, and value factor. Additionally, the method includes comparing the priority levels to each other, and determining a desired communication service based on the compared priority levels.

In another aspect of the present invention a method for choosing a communication service for an application is disclosed. The method includes providing information relating to the application and data to communicate in the application to a computer-based tool, receiving from the tool a ranked list of recommended communication services suitable for use based on the provided information, and choosing one or more communication services from the list.

In yet another embodiment of the present invention a system for determining at least one communication service for an application is disclosed. The system includes means for receiving data indicative of one or more of at least one application operating parameter, at least one communication operating parameter, at least one cost factor, and at least one value factor. The system further includes a processor including a priority level setting module to set priority levels of the received data, a priority comparator module to compare the priority levels, and a communication service module to determine desired communication services in response to the compared priority levels. In addition, the system includes means for providing the desired communication services to a user.

BRIEF DESCRIPTION OF THE DRAWINGS

FIG. 4 is a flow diagram illustrating a method used with the present invention.

DETAILED DESCRIPTION

Figure 1:
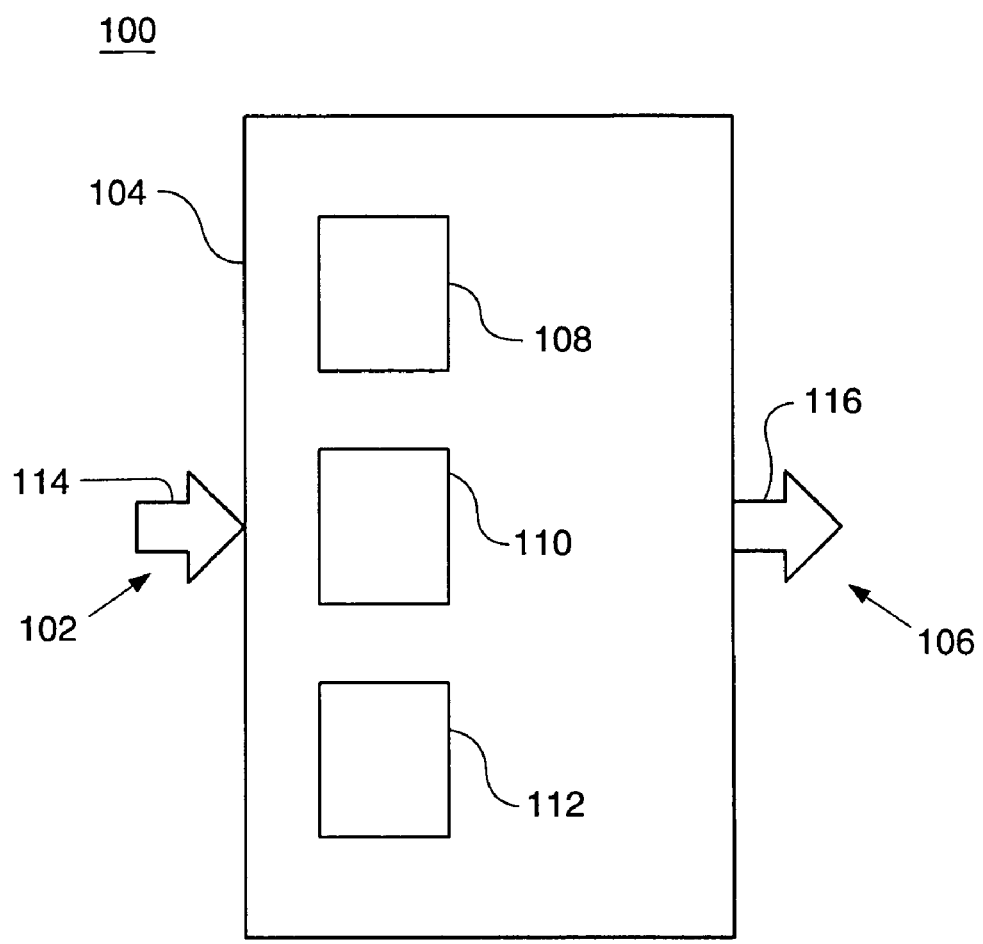
FIG. 1 is a block diagram illustrating an aspect of the present invention.

Referring to the drawings, a method and system 100 for determining one or more desired communication services is disclosed. With particular reference to FIG. 1, a block diagram illustrating a system 100 suited for use with the present invention is shown.

The system 100 of FIG. 1 includes means 102 for receiving data, such as an input 114 of some type. Typical means 102 for receiving data may include a keyboard, a mouse, an input data port of either serial or parallel configuration, a media input device such as a CD-ROM or tape reader, or any other type of device or configuration that may allow input of data. In addition, means 102 for receiving data may include any one device or any combination of multiple devices.

A processor 104 is configured to obtain data from the means 102 for receiving data, and responsively process the data in a desired fashion. The processor 104 may be computer-based, such as a stand-alone computer, a network computer terminal, or a server, and may be configured to interface with web-based applications.

Also included in the system 100 may be means 106 for providing desired communication services to a user, e.g., an output 116 from the processor 104. The means 106 for providing desired communication services may embody such devices as a display monitor, a printer, a serial or parallel data port, a data storage medium, or any combination of such devices.

The input 114, processor 104, and output 116 may be configured together as a computer station, and may be connected to a web-based service such as the Internet. Furthermore, the input 114 and output 116 may be located at one site, such as at a user's terminal, and the processor, as embodied in FIG. 1 and described in more detail below, may be located at another site, for example accessible by way of the Internet. Thus, one processor 104 may provide determination of desired communication services to each of multiple users at remote locations.

The processor 104 may include various modules to perform specific tasks and data manipulation/analysis. For example, a priority level setting module 108 may be used to set priority levels of received data, as described in more detail below. A priority comparator module 110 may compare the above set priority levels with each other, and a communication service module 112 may be used to determine desired communication services in response to the compared priority levels.

Figure 3:
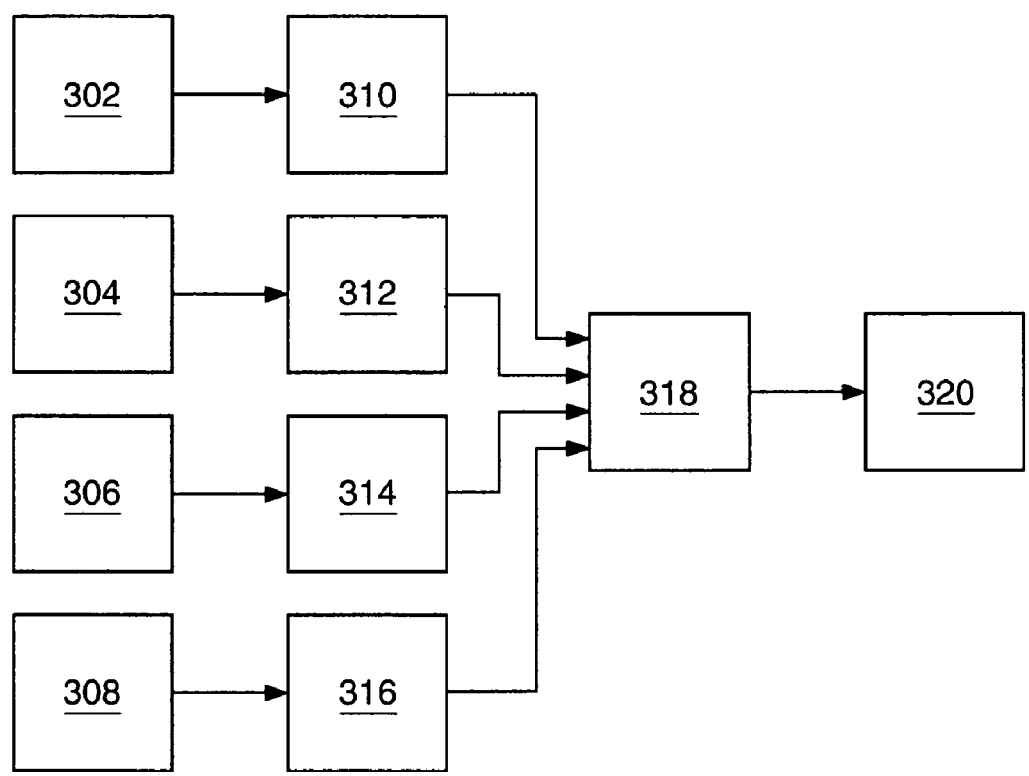
FIG. 3 is a block diagram depicting another aspect of the present invention.

Referring to FIG. 3, various types of specific information may be provided to the processor 104 via input 114. At least one application operating parameter 302, at least one communication operating parameter 304, at least one cost factor 306, and at least one value factor 308, all of which are described in detail below, may be input to the processor 104.

The priority level setting module 108 may then determine a priority level 310 for each application operating parameter 302, a priority level 312 for each communication operating parameter 304, a priority level 314 for each cost factor 306, and a priority level 316 for each value factor 308. All of these priority levels 310,312,314,316 may then be delivered to the priority comparator module 110 for comparison with each other.

The communication service module 112 receives the comparison results, and determines one or more desired communication services 320. If multiple desired communication services are selected, then processor 104 may rank each communication service based on suitability for use in the desired application. This determined data may then be delivered to a user by way of the output 116.

Figure 2:
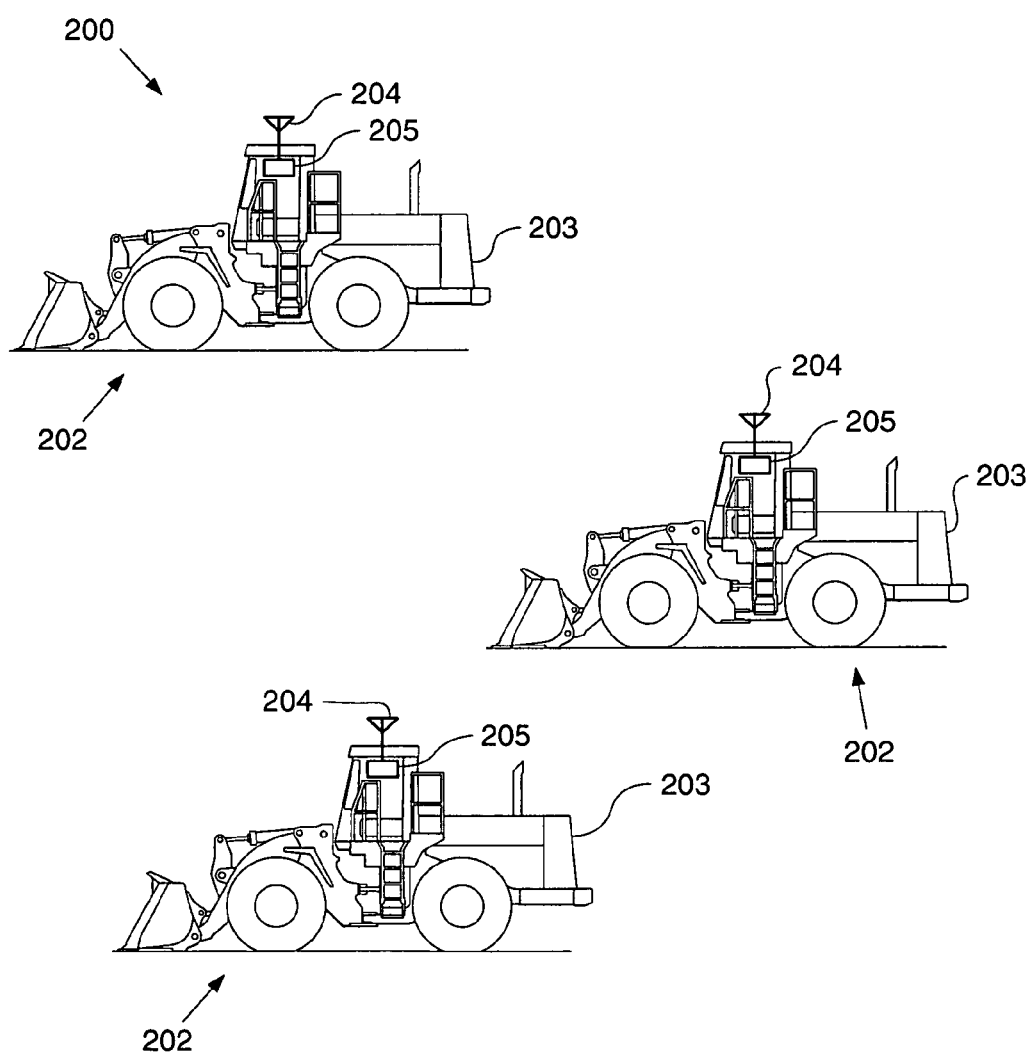
FIG. 2 is a diagrammatic illustration of an application of the present invention.

Referring to FIG. 2, an application 200 that may benefit from use of the present invention is shown by way of example. As the application 200 is exemplary only, it is noted that other uses for the present invention may be envisioned and the example depicted in FIG. 2 is not intended to limit the scope of the claimed invention.

The application 200 of FIG. 2 is shown as a mobile application 202, as embodied by a plurality of mobile machines 203. The mobile machines 203 may be work machines used to perform various tasks, for example construction or mining machines used for earthworking applications. Other types of mobile machine combinations may be used as well, such as fleets of trucks or automobiles, and any other types of mobile machines. Various combinations of mobile machines of differing types and purposes may be used in combination.

At least one mobile machine 203 may include a wireless communication service 204. As shown in FIG. 2, each mobile machine 204 has a wireless communication service 204 for communications with each other mobile machine 203 and with other locations (not shown), such as additional mobile machines or a remote office.

Each wireless communications service 204 includes a device 205 to perform wireless communications. The device 205 may be based on any of several types of communications methods and technologies, such as wireless local area network, wireless wide area network, cellular, satellite, radio technology of any desired frequency range and modulation technique, and any other wireless communication technique suited for use in the particular application and environment. Furthermore, the device 205 may employ multiple communications techniques to accommodate changing conditions or needs.

A typical application of the claimed invention to the situation of FIG. 2 may include the owner/operator of the mobile machines 203 contacting a dealer or vendor that is enabled to use the claimed invention. The owner/operator may be seeking advice regarding the most appropriate wireless communication services 204 and associated devices 205 to use, and may contact the vendor either directly or via a website set up for this purpose. The owner/operator would be prompted to provide certain information, and the computer-based system 100 of the claimed invention would be configured to determine the optimal desired communication services to use based on the information received. In a preferred embodiment, the computer-based system 100 would be set up to perform the analysis and determination automatically; that is, would prompt the owner/operator for the necessary information, and would provide the suggested desired services as a result of software-based processing.

INDUSTRIAL APPLICABILITY

Referring to FIG. 4, a flow diagram illustrating a method for performing the present invention is shown.

In a first control block 402, at least one application operating parameter is determined. An application operating parameter may relate to a location for the application 200, such as proximity to available communication services, distances between mobile machines 203 or other communication destinations, environmental conditions, and the like.

In a second control block 404, at least one communication operating parameter is determined. A communication operating parameter may include such features as bandwidth needed for communicating data, importance of the data being communicated (e.g., the level of need for reliable transmission of data), the frequency of communication transactions, and the like.

In a third control block 406, at least one cost factor is determined. A cost factor may relate to an initial cost for communication services and equipment, as well as ongoing costs such as usage fees and the like.

In a fourth control block 408, at least one value factor is determined. A value factor, as opposed to a cost factor, takes into account the value of the information to be communicated.

The application operating parameters, communication operating parameters, cost factors, and value factors are interrelated in a complex manner. Thus, it is very difficult, if not impossible, to take all of these factors into account by traditional intuitive, manual methods since any one factor has an effect on all of the other factors. The result by traditional means is a "best guess" approach as to the desired communication services to implement, which often does not result in the optimal solution.

In a fifth control block 410, a priority level is assigned to each of the application operating parameters, the communication operating parameters, the cost factors, and the value factors. For example, the priority level setting module 108 in processor 104 may be configured to determine and assign these priority levels using any of a variety of known weighting techniques.

In a sixth control block 412, the assigned priority levels are compared to each other, such as by use of the priority comparator module 110 in processor 104. Control proceeds to a seventh control block 414, in which a desired communication service is determined based on the compared priority levels. The determined desired communication service may include more than one service in some cases, for example as a result of variability in conditions, or portions of the application 200 having different needs and conditions than other portions.

In some situations more than one communication service may be determined to be desired. Control would then proceed to an eighth control block 416, in which each of the multiple determined services would be ranked for suitability of use in the application 200, and the owner/operator may then have the option of choosing one or more communication services based on the ranking. In another embodiment, a list of communication services determined from the priority level comparison step (step 412) would be ranked, and the results provided to the owner/operator for subsequent determination of which services to use.

Other aspects can be obtained from a study of the drawings, the disclosure, and the appended claims.

LIST OF ELEMENTS

100 System
102 Means for receiving data
104 Processor
106 Means for providing desired communication services
108 Priority level setting module
110 Priority comparator module
112 Communication service module
114 Input
116 Output
200 Application
202 Mobile application
203 Mobile machine
204 Wireless communication service
205 Device
302 Application operating parameter
304 Communication operating parameter
306 Cost factor
308 Value factor
310 Priority level for application operating parameter
312 Priority level for communication operating parameter
314 Priority level for cost factor
316 Priority level for value factor
318 Priority comparator
320 Desired communication service

What is claimed is:

1. A method for a user of a vehicle to select a communication service for the vehicle amongst a plurality of available communication services, the method comprising the steps of:
providing a computer-based system including a processor, the processor comprising a priority level setting module, priority comparator module and a communications service module;
entering a plurality of information types comprising at least one application operating parameter, at least one communication operating parameter, at least one cost factor, and at least one value factor, the plurality of information types being entered by the user;
assigning a priority level to each information type in the plurality of information types to generate a plurality of assigned priority levels by inputting the plurality of information types into the priority level setting module of the processor;
comparing the assigned priority levels to each other by inputting the assigned priority levels into the priority comparator module of the processor to generate a plurality of compared priority levels; and
selecting at least one desired communication service from the plurality of available communication services based on the compared priority levels, the selecting of the at least one desired communication service being performed by the communications service module.

2. A method, as set forth in claim 1, wherein determining at least one application operation parameter includes the step of determining one or more parameters related to a location of the vehicle.

3. A method, as set forth in claim 1, wherein determining at least one application operating parameter includes the step of determining a number of vehicles using the communication service.

4. A method, as set forth in claim 3, wherein determining at least one communication operating parameter includes the step of determining relative distances between the vehicles.

5. A method, as set forth in claim 1, wherein determining at least one cost factor includes the step of determining a monetary cost of the communication service.

6. A method, as set forth in claim 1, wherein determining at least one value factor includes the step of determining at least one factor related to a value of information being communicated.

7. A method, as set forth in claim 1, wherein selecting of at least one desired communication service includes the steps of:
selecting a plurality of communication service options in the communications service module based on compared priority levels received in the communications service module from the priority comparator module;
ranking each of the communication service options in the communications service module based on suitability for use in the vehicle; and
having the user review the rankings and select one of the desired communication services.

8. A method for choosing a communication service for an application from a plurality of available communication services, comprising the steps of:
providing a computer-based system including a computer-based tool including a processor that includes a priority setting module, a priority comparator module and a communications service module, a display monitor, information relating to the application, and data to communicate from the application to the priority setting module;
communicating data to the priority setting module, the data including a plurality of information types comprising at least one application operating parameter, at least one communication operating parameter, at least one cost factor, and at least one value factor, the plurality of information types, the priority setting module assigning a priority level to each information type of the plurality of information types to generate a plurality of assigned priority levels;
comparing the assigned priority levels to each other by inputting the plurality of assigned priority levels into the priority comparator module of the processor to generate a plurality of compared priority levels;
generating a ranked list of recommended communication services in the communications service module that are suitable for use based on the plurality of compared priority levels;
displaying the ranked list on the display monitor; and
manually choosing one or more communication services from the ranked list.

9. A method, as set forth in claim 8, wherein the computer-based tool is a web-based tool.

10. The method of claim 8, wherein the application is an earth-moving vehicle, and the manual choosing is performed by a driver of the earth-moving vehicle.

11. A computer-based system for determining at least one communication service for a vehicle from a plurality of available communication services, comprising:
means for receiving data indicative of one or more of at least one application operating parameter, at least one communication operating parameter, at least one cost factor, and at least one value factor, the means for receiving data being provided on the vehicle and enabling a user of the vehicle to enter the data;
a processor including:
a priority level setting module to assign priority levels of the received data;

a priority comparator module to compare the assigned priority levels; and a communication service module to determine a ranked list of desired communication services in response to the compared priority levels; and means for providing the desired communication services to a user, the means for providing the desired communication services being provided on the vehicle and enabling a user of the vehicle to review the ranked list of communication services and manually select the desired communication service.

12. A computer-based system, as set forth in claim 11, wherein the means for receiving data includes an input device.

13. A computer-based system, as set forth in claim 12, wherein the input device is selected from the group consisting of a keyboard, a mouse, an input data port, and an media input device.

14. A computer-based system, as set forth in claim 11, wherein the means for providing the desired communication services to a user includes an output device.

15. A computer-based system, as set forth in claim 14, wherein the output device is selected from the group consisting of a display monitor, a printer, a data port, and a data storage medium.

16. A computer-based system, as set forth in claim 15, wherein the application operating parameter relates to a physical location of the vehicle.

17. A computer-based system, as set forth in claim 11, wherein the at least one communication service includes at least one wireless communication service.

18. A computer-based system, as set forth in claim 11, wherein the means for receiving data includes an input, the means for providing the desired communication services to a user includes an output, and the input and output are accessed through a website.

* * * * *